United States Patent
Barsness et al.

(10) Patent No.: US 10,042,611 B2
(45) Date of Patent: Aug. 7, 2018

(54) STREAM OPERATOR MANAGEMENT

(71) Applicant: International Business Machines Corporation, Armonk, NY (US)

(72) Inventors: Eric L. Barsness, Pine Island, MN (US); Alexander Cook, Rochester, MN (US); Manuel Orozco, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 15/076,601

(22) Filed: Mar. 21, 2016

(65) Prior Publication Data
US 2017/0269911 A1   Sep. 21, 2017

(51) Int. Cl.
*G06F 9/44* (2018.01)
*G06F 8/20* (2018.01)
*G06F 17/30* (2006.01)
*H04L 29/06* (2006.01)
*G06F 8/36* (2018.01)

(52) U.S. Cl.
CPC ............. *G06F 8/20* (2013.01); *G06F 8/36* (2013.01); *G06F 17/30516* (2013.01); *H04L 65/60* (2013.01)

(58) Field of Classification Search
None
See application file for complete search history.

(56) References Cited

U.S. PATENT DOCUMENTS

| | | | |
|---|---|---|---|
| 6,721,951 B1 | 4/2004 | Williams et al. | |
| 8,255,554 B2 | 8/2012 | Andrade et al. | |
| 8,490,072 B2* | 7/2013 | Andrade | G06F 8/433 717/132 |
| 9,112,666 B2 | 8/2015 | Gedik et al. | |
| 9,407,944 B1* | 8/2016 | Galdy | H04N 21/2385 |
| 9,563,537 B1* | 2/2017 | Barsness | G06F 11/362 |
| 2002/0083183 A1* | 6/2002 | Pujare | G06F 8/65 709/231 |
| 2002/0157089 A1* | 10/2002 | Patel | G06F 8/65 717/178 |
| 2002/0161908 A1* | 10/2002 | Benitez | G06F 8/65 709/231 |
| 2002/0184610 A1* | 12/2002 | Chong | G06F 8/20 717/109 |
| 2003/0009538 A1* | 1/2003 | Shah | H04L 63/0281 709/219 |

(Continued)

OTHER PUBLICATIONS

International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>, retrieval date: Mar. 6, 2016.

*Primary Examiner* — Insun Kang
(74) *Attorney, Agent, or Firm* — Tihon Poltavets

(57) ABSTRACT

Disclosed aspects relate to stream operator management. A stream operator may be analyzed with respect to a set of usage indicators. The stream operator may operate on a computer processor and correspond to a processing element for processing a stream of tuples. Based on analyzing the stream operator, a set of profile data for the stream operator may be determined. The set of profile data for the stream operator may be established for utilization to develop a streaming application.

17 Claims, 9 Drawing Sheets

(56) References Cited

U.S. PATENT DOCUMENTS

| | | | |
|---|---|---|---|
| 2009/0113400 A1* | 4/2009 | Pelleg | G06F 11/3466 717/130 |
| 2010/0293301 A1* | 11/2010 | Amini | G06F 9/544 710/12 |
| 2010/0293534 A1* | 11/2010 | Andrade | G06F 8/447 717/146 |
| 2010/0293535 A1* | 11/2010 | Andrade | G06F 8/433 717/156 |
| 2013/0305212 A1 | 11/2013 | Reisbich | |
| 2014/0095503 A1* | 4/2014 | Branson | G06F 17/30516 707/737 |
| 2014/0122557 A1* | 5/2014 | Branson | H04L 67/02 709/201 |
| 2014/0122559 A1* | 5/2014 | Branson | H04L 67/02 709/201 |
| 2014/0196017 A1 | 7/2014 | Halim et al. | |
| 2015/0135163 A1* | 5/2015 | Mun | G06F 8/71 717/120 |
| 2015/0235015 A1* | 8/2015 | Holler | G06F 21/105 726/27 |
| 2015/0281313 A1* | 10/2015 | Bragstad | H04L 41/0806 709/219 |
| 2015/0370800 A1* | 12/2015 | Branson | G06F 17/3053 707/723 |
| 2015/0370837 A1* | 12/2015 | Branson | G06F 17/3053 707/748 |
| 2015/0373071 A1 | 12/2015 | Cao et al. | |
| 2016/0006817 A1* | 1/2016 | Mitic | H04L 65/4076 709/232 |
| 2016/0048565 A1* | 2/2016 | Cammert | G06F 17/30516 707/776 |

\* cited by examiner

STREAM OPERATOR MANAGEMENT

BACKGROUND

This disclosure relates generally to computer systems and, more particularly, relates to managing one or more stream operators associated with a streaming application. The amount of data that needs to be managed by enterprises is increasing. Management of stream operators may be desired to be performed as efficiently as possible. As data needing to be managed increases, the need for management efficiency may increase.

SUMMARY

Aspects of the disclosure relate to utilizing performance profiles of stream operators to facilitate the development of streaming applications. The performance profiles may be generated based on historic performance data or performance metric monitoring. The performance profiles may be used to provide dynamic feedback on stream application design within an integrated development environment, and recommend or apply features to improve performance of the stream application. The performance profiles may provide information regarding the expected performance of a given stream operator or stream application in certain configurations.

Aspects of the disclosure relate to stream operator management. A stream operator may be analyzed with respect to a set of usage indicators. The stream operator may operate on a computer processor and correspond to a processing element for processing a stream of tuples. Based on analyzing the stream operator, a set of profile data for the stream operator may be determined. The set of profile data for the stream operator may be established for utilization to develop a streaming application.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
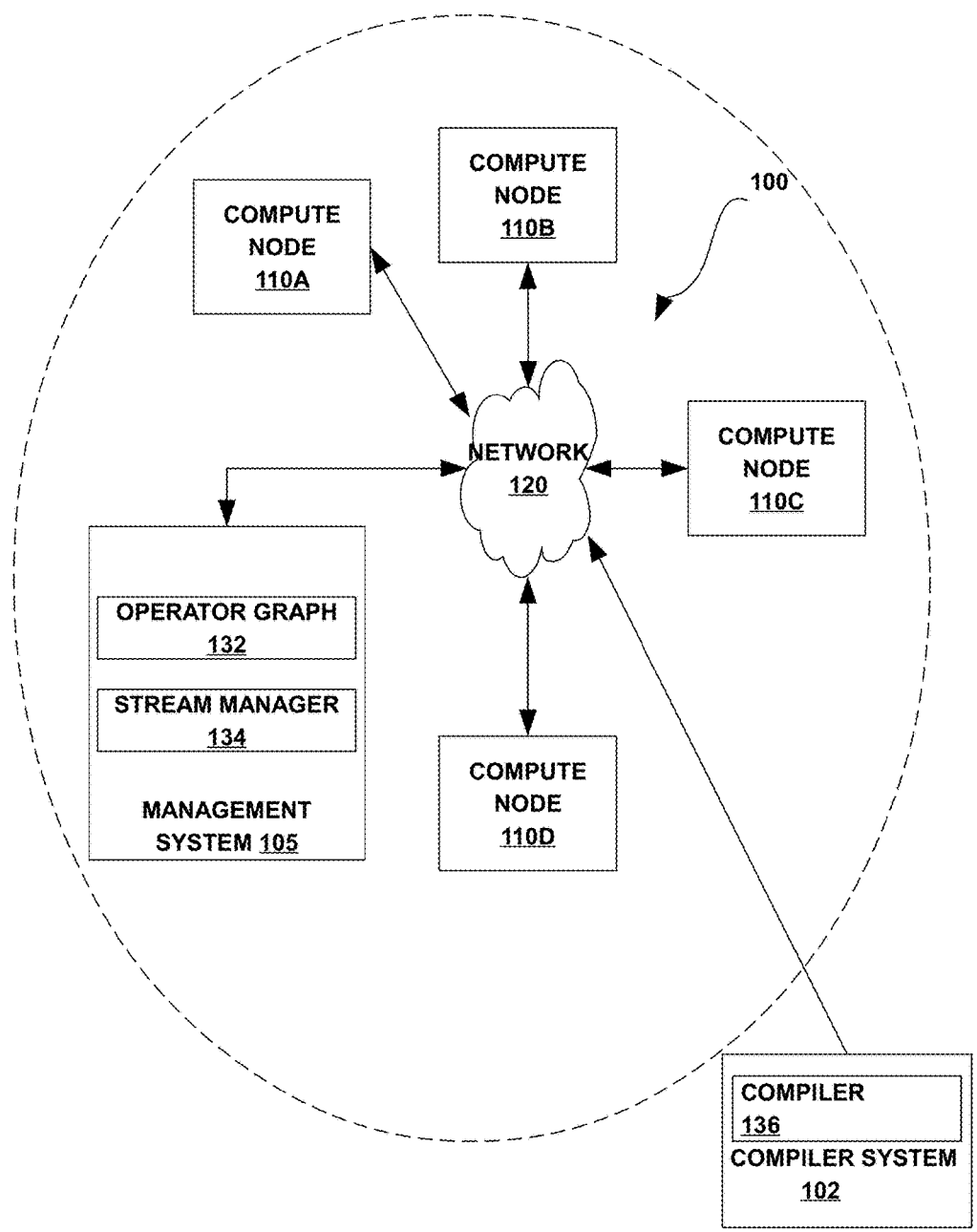
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to utilizing performance characteristics of stream operators to facilitate the development of stream computing applications. Performance profiles for stream operators may be generated based on existing historical performance data or acquired dynamically using performance monitoring techniques. The performance profiles for the stream operators may be provided within a stream application development environment to offer information regarding the expected performance of a given stream operator or stream application within certain configurations. By leveraging the information provided by stream operator performance profiles, performance or efficiency benefits for stream application development may result (e.g., development speed, computing resource efficiency).

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using interprocess communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system, and computer program product for stream operator management. A stream operator which operates on a computer processor and corresponds to a processing element for processing a stream of tuples may be analyzed. In embodiments, analyzing the stream operator may include evaluating historical performance data or monitoring the running performance of the stream operator. Based on the analysis of the stream operator, a set of profile data for the stream operator may be determined. The set of profile data for the stream operator may be established for utilization to develop a streaming application. In embodiments, establishing the set of profile data may include providing the set of profile data for the stream operator in an integrated development environment or while constructing implementation code. Altogether, performance or efficiency benefits with respect to stream application development and stream computing may occur (e.g., speed, flexibility, ease of development, resource usage, productivity.) Aspects may save resources such as user time, computer bandwidth, memory, and processing resources.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
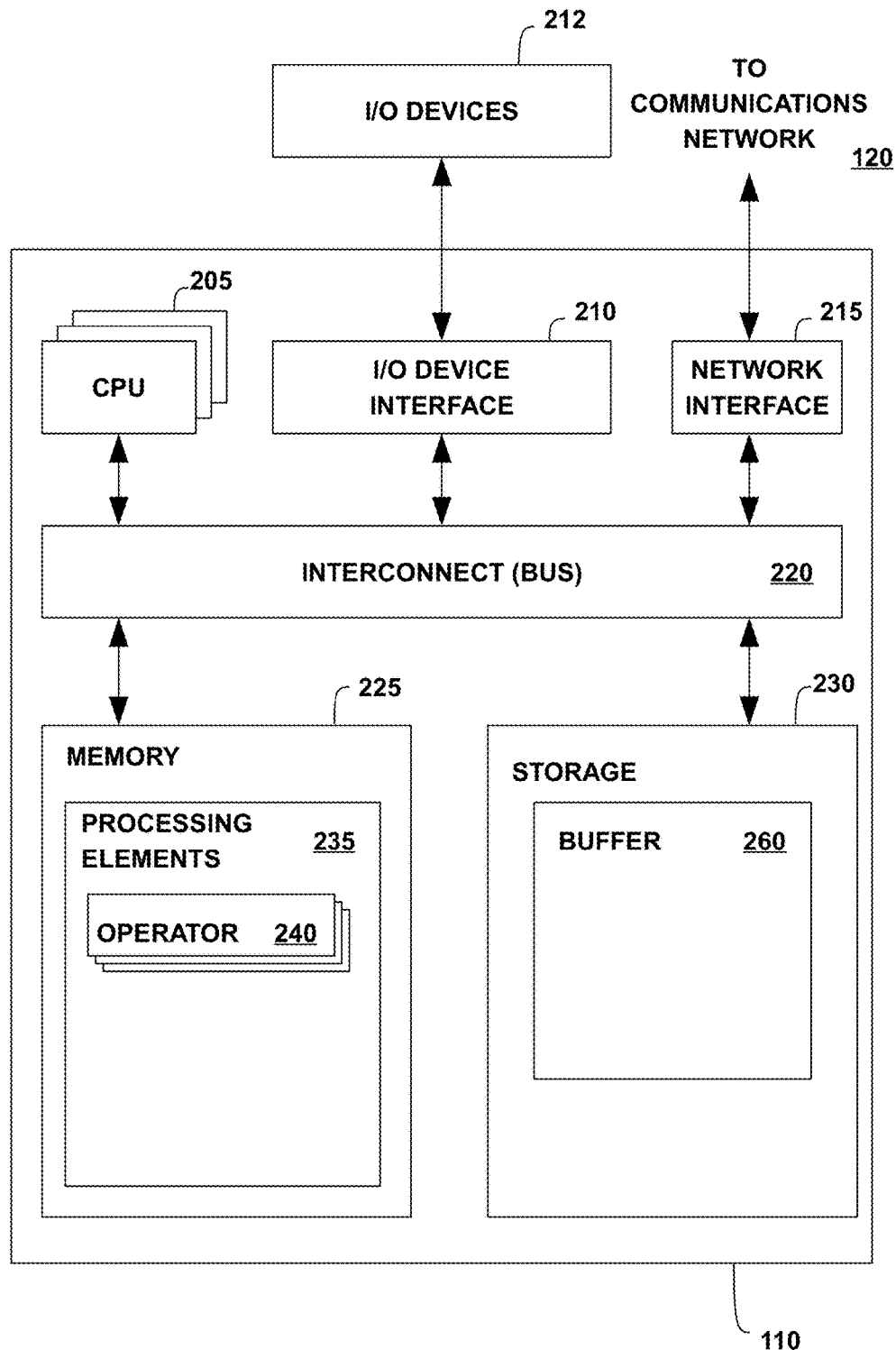
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
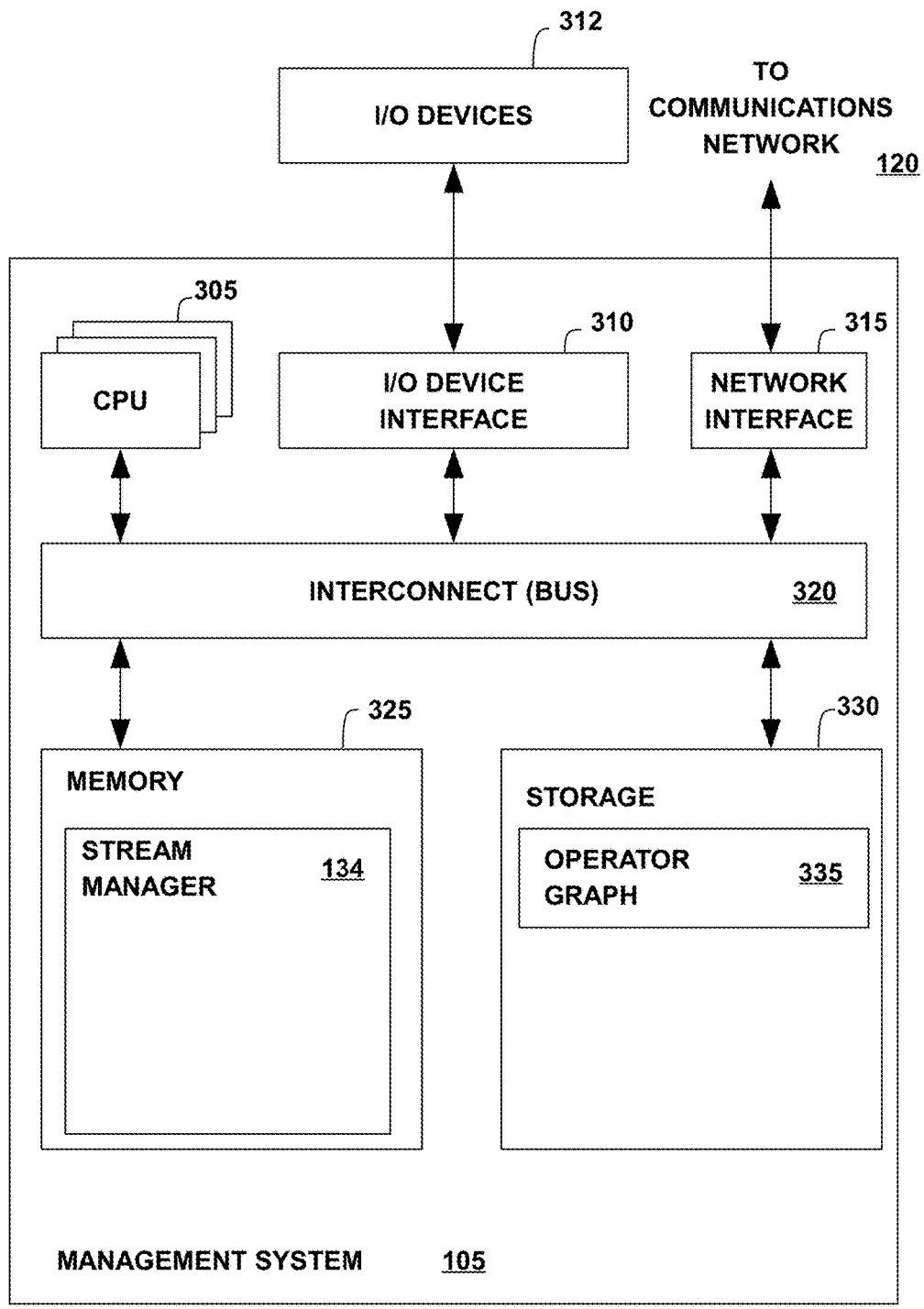
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
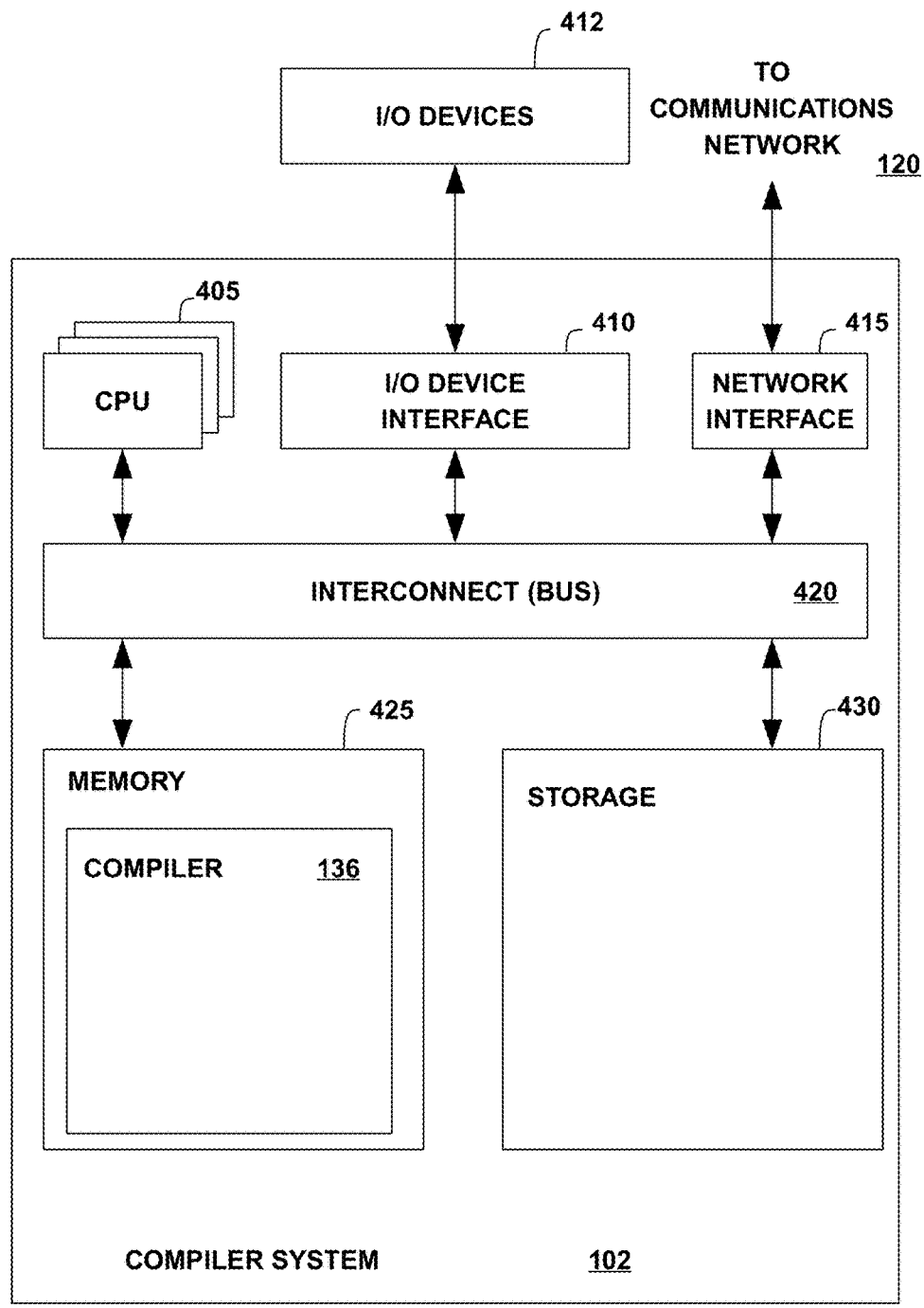
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
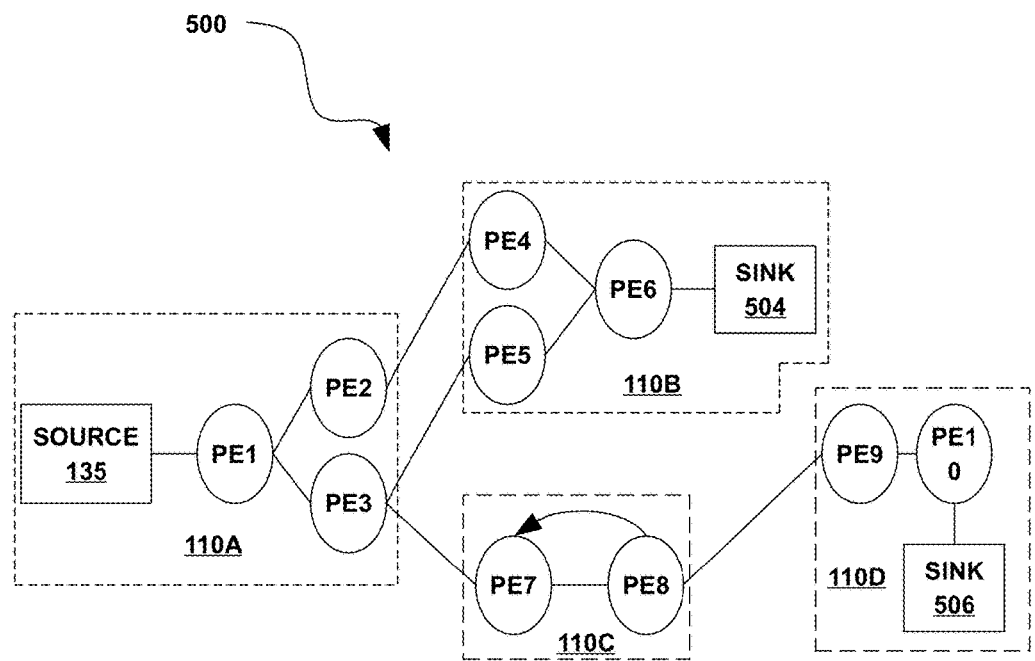
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
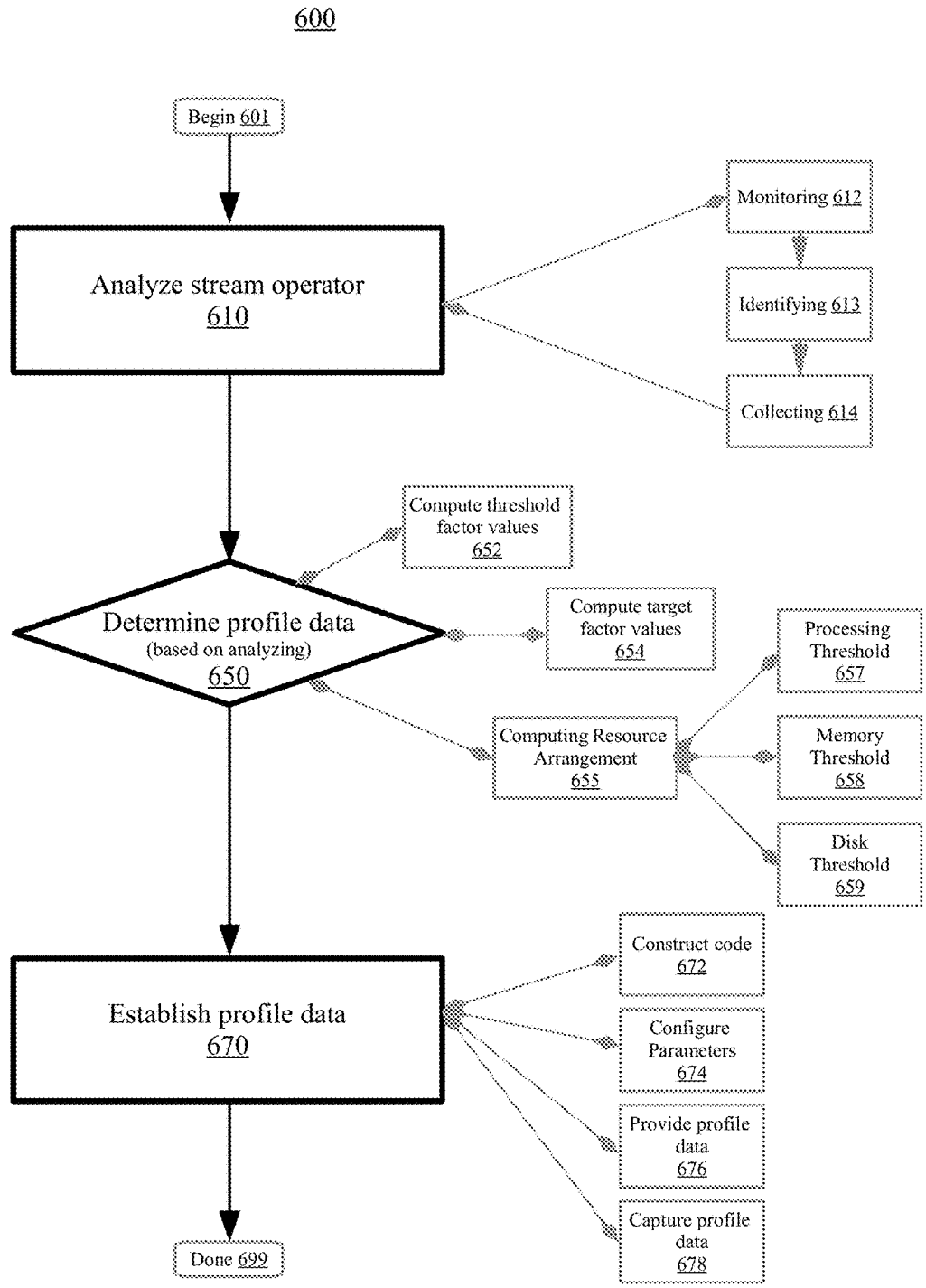
FIG. 6 is a flowchart illustrating a method for managing one or more stream operators associated with a streaming application, according to embodiments.

FIG. 6 is a flowchart illustrating a method 600 for managing one or more stream operators associated with a streaming application, according to embodiments. The one or more stream operators may include processing threads configured to perform operations (e.g., analysis logic, attribute modification) on data (e.g., tuples) as part of a stream computing application. In embodiments, stream operators may have performance characteristics that describe how a particular stream operator processes data. Aspects of the disclosure relate to utilizing the performance characteristics for stream operators to establish a performance profile to facilitate the development of stream applications. Method 600 may begin at block 601.

At block 610, one or more stream operators may be analyzed. In embodiments, the stream operators may be analyzed with respect to a set of usage indicators. The stream operators may operate on a computer processor and correspond to a processing element (e.g., processing thread) for processing a stream of tuples. The stream operators may be analyzed consistent with the description herein including FIGS. 1-9. Generally, analyzing the stream operators may include examining how a given stream operator makes use of computing resources in a particular computing environment. In embodiments, analyzing can including determining information regarding the performance characteristics of one or more stream operators. Analyzing can include examining (e.g., performing an inspection of the stream operators), evaluating (e.g., generating an appraisal of the stream operators), resolving (e.g., ascertaining an observation/conclusion/answer with respect to the stream operators), parsing (e.g., deciphering a construct for the stream operators), querying (e.g., asking a question regarding the stream operators), or categorizing (e.g., organizing by a feature or attribute of the stream operators). Data analysis may include a process of inspecting, cleaning, transforming, or modeling data to discover useful information, suggest conclusions, or support decisions. Data analysis can extract information/patterns from a data set and transform/translate it into an understandable structure for further use.

As described herein, in embodiments the stream operators may be analyzed with respect to a set of usage indicators. The set of usage indicators may include statistics, values, performance characteristics, recordings, test results, quantitative factors or other data or information that expresses an extent, nature, or scope of utilization of one or more resources (e.g., computing resources) with respect to one or more stream operators. The set of usage indicators may indicate a performance result (e.g., amount of useful work accomplished compared to the time and resources used) of the stream operator within a particular parameter configuration (e.g., running on a particular host device). As examples, the set of usage indicators may include a processor utilization factor (e.g., central processing unit resources usage), a memory utilization factor (e.g., random access memory resources usage), a disk utilization factor (e.g., persistent storage resources usage), or a throughput factor (e.g., network bandwidth resources). Other types of usage indicators are also possible.

In embodiments, analyzing the stream operator with respect to the set of usage indicators may include monitoring the stream operator at block 612. Monitoring can include scanning, tracking, recording, collecting, logging, detecting, examining, or otherwise observing the stream operator to gather information regarding the set of usage indicators (e.g., performance characteristics) of the stream operator. In embodiments, monitoring the stream operator can include gathering existing information from historical usage data (e.g., developer provided performance specification information, archived usage results). In embodiments, monitoring can include real-time evaluation of the stream operator through performance testing (e.g., testing techniques performed to investigate, measure, validate, verify reliability or scalability, and resource usage of the stream operator). Performance testing may include dedicated performance trials as well as diagnostic monitoring of actual usage.

In embodiments, analyzing the stream operator with respect to the set of usage indicators may include identifying a set of values for the set of usage indicators at block 613. Identifying the set of values for the set of usage indicators may be based on the monitoring performed at block 612. Identifying the set of values for the set of usage indicators may include detecting, discovering, ascertaining, or otherwise determining one or more quantitative indications of the amount or magnitude for the set of usage indicators. As an example, identifying the set of values may include recognizing specifications corresponding to one or more usage indicators from developer provided documentation or statistics from performance testing results. In embodiments, the set of values for the set of usage indicators may include absolute resource values (e.g., 3.7 GHz, 500 Mb/s) or relative usage statistics (e.g., 42% central processing unit utilization, 66% storage usage). As examples, the processor utilization factor may include a value of 2.4 GHz, the memory utilization factor may include a value of 6 GB, the disk utilization factor may include a value of 1 TB, and the throughput factor may include a value of 79 Gbit/s.) Other types of values for the set of usage indicators are also possible.

In embodiments, analyzing the stream operator with respect to the set of usage indicators may include collecting the set of values to facilitate determination of the set of profile data for the stream operator at block 614. Collecting the set of values to facilitate determination of the set of profile data for the stream operator may include gathering, accumulating, assembling, compiling, arranging, unifying, or aggregating the set of values. In embodiments, collecting the set of values may include extracting the set of values (e.g., the set of values identified at block 613) from developer provided documentation or performance testing results and recording it in a central database or data log. As an example, a value of "85 tuples/second at 100% CPU usage" identified as being related to the usage indicator of throughput factor may be selected and recorded with respect to its corresponding stream operator. Other methods of collecting the set of values are also possible.

At block 650, a set of profile data is determined for the stream operator. The set of profile data can be based on the analyzing as described herein. In embodiments, the set of profile data may include a characterization or description of a stream operator that provides information regarding the performance characteristics, resource utilization properties, recommended implementation configurations, and the like.

The set of profile data may include statistics based on the set of usage indicators collected at block 614. As examples, the profile data may include the throughput rate (e.g., number of tuples processed per unit time), processor utilization (e.g., central processing unit resources allocated for tuple processing), memory utilization (e.g., RAM resources available for stream operator use), disk utilization (e.g., hard drive or solid state drive space used to store a streaming application), and other data that describes the attributes and performance properties of a particular stream operator. The information included in the performance profile may vary based on the type of operator. As an example, an aggregate operator may include values for window sizes, tuple sizes, attribute numbers, and the like. The data and information included in the profile data may be represented and organized in a variety of ways. For example, the profile data may include graphs and charts illustrating the performance of the stream operator over time, textual descriptions of the stream operator's performance, example usage scenarios and the like. Other data and information beyond that explicitly described herein may also be included in the set of profile data.

In certain embodiments, the set of profile data for the stream operator may include one or more of a tuple type (e.g., incoming tuples, outgoing tuples, tuples with a shared attribute), a tuple quantity threshold value (e.g., a number of tuples that can be held by an operator at one time), a tuple size threshold value (e.g., volume of tuple data that an operator can hold/process at one time), a tuple processing rate threshold value (e.g., number of tuples that can be processed per given unit of time), an attribute type (e.g, operational attributes such as read, write, output and input), an attribute quantity threshold value (e.g., number of attributes that enter an operator for processing), an attribute size threshold value (e.g., volume of data that can be allocated for operator attributes), a window size threshold value (e.g., number of tuples that can be contained in a window before processing or tuple eviction is triggered), or a temporal period threshold value (e.g., length of time allocated for an action by an operator). As described herein, the data and information included in the set of profile data may differ based on the nature of the stream operator. Other types of data and information may also be included in the set of profile data.

Determining the set of profile data for the stream operator may include selecting, deciding, resolving, concluding, or otherwise ascertaining the set of profile data. In embodiments, determining the set of profile data for the stream operator may include processing and editing the performance characteristics and other information (e.g., the set of values collected for the set of usage indicators at block 614). For instance, in certain embodiments, the set of values for the usage indicators may be filtered and organized to emphasize the information that is considered to be relevant (e.g., useful) with respect to a particular stream operator. As an example, the profile data for a gate operator (e.g., an operator configured to control the rate at which tuples are passed through) may be organized in such a way as to emphasize a range of configurable throughput options. Other methods of determining the set of profile data for the stream operator are also possible.

In various embodiments, at block 652, determining the set of profile data for the stream operator may include computing a set of threshold factor values which correspond to the set of usage indicators. Generally, the threshold factor values may include utilization ranges, boundary points, or ceilings/floors for the set of usage indicators. Stated differently, the threshold factor values may include usage parameters that indicate upper and lower usage levels for various properties of the stream operator. As an example, for the throughput rate usage indicator, threshold factor values may be calculated that include minimum (e.g., 10 tuples/second) and maximum (e.g., 100 tuples/second) throughput rates for a particular stream operator. In embodiments, the threshold factor values may be extracted from developer provided specification documentation, estimated based on archived performance data, or calculated based on real-time performance metrics. In embodiments, the threshold factor values may be included in profile data for a stream operator. Other methods of determining the threshold factor values are also possible.

Consider the following example. In embodiments, it may be desirable to determine the throughput rates of a particular stream operator (e.g., number of tuples a given operator can process per unit time). Accordingly, high volumes of data may be sent to the stream operator, and the output monitored to observe the number of tuples processed by the operator per second. For instance, it may be observed that a particular stream operator can process between 170-180 tuples per second at average resource allocation configurations. In embodiments, aspects of the data throughput testing may include running the stream operator at 100% CPU usage (e.g., providing the stream operator the maximum amount of CPU resources needed to process tuples at full capacity) to obtain an accurate result of the upper throughput rate threshold (e.g., expected maximum throughput performance). Accordingly, the stream operator may be provided full CPU usage and performance tested to calculate the upper throughput rate threshold. In embodiments, the upper throughput rate threshold may be determined to be 320-340 tuples per second. This upper throughput rate threshold may be included in the profile data for the tested stream operator.

In certain embodiments, aspects relate to the recognition that it may not be practical to run a stream operator at 100% CPU usage. In such scenarios, throughput rates may be measured for the stream operator at a one or more different CPU usage values, and this data may be used to calculate an estimated maximum throughput performance (e.g., if it is measured that a given stream operator processes 25 tuples per second at 25% CPU usage and 50 tuples per second at 50% CPU usage, these results may be extrapolated to estimate that 100 tuples may be processed per second at 100% CPU usage). Similar performance testing techniques may be utilized for other computing resources (e.g., RAM). Other methods of determining performance characteristics for the stream operator are also possible.

In various embodiments, at block 654, determining the set of profile data for the stream operator may include computing a set of target factor values which correspond to the set of usage indicators. Generally, the target factor values may include parameters that yield the desired output or level of performance for a particular stream operator. In embodiments, the target factor values may include a range of usage parameters that lie between the upper and lower threshold values and offer steady performance for moderate resource expenditure. Similar to the threshold factor values, the set of target factor values may be extracted from developer provided specification documentation, estimated based on archived performance data, or calculated based on real-time performance metrics. As an example, for a stream operator that has an identified upper throughput rate of 200 tuples per second at 100% CPU usage and a lower throughput rate of 2 tuples per second at 1% CPU usage, it may be determined (e.g., based on performance diagnostic analysis) that a CPU resource allocation of 55% (e.g., resulting in a throughput rate of 110 tuples per second) maintains steady tuple flow (e.g., relative to other operators of the streaming application) without unduly taxing computing resources. Accordingly, 55% CPU usage may be used as a target factor value corresponding to the processing resources usage indicator. Similar target factor values may be determined for other types of computing resources. As described herein, the target factor values may be included in the profile data for the corresponding stream operator.

In certain embodiments, a first throughput value using the set of target factor values exceeds a second throughput value using a set of original factor values. Stated differently, the first throughput value may be an expected or projected throughput value achieved by making use of the parameter settings indicated by the target factor values. As described herein, the first throughput value may be greater (e.g., represent a higher throughput rate) than a second throughput value. The second throughput value may be a throughput rate achieved using a set of original factor values (e.g., parameter settings other than the target factor values that do not correspond to desired performance results). As an example, in certain embodiments, the first throughput value may be 150 tuples per second (e.g., achieved using the set of target factor values) and the second throughput value may be 90 tuples per second (e.g., achieved using the original factor values).

Consider the following example. In embodiments, the set of target factor values may be configured to maintain a balance between expended resources and output performance to achieve a first throughput value that represents a "sweet spot" of operation efficiency. In embodiments, achieving the first throughput value may include consideration of the streaming application configuration as a whole (e.g., rather than the operators individually). As an example, in a streaming application that includes a sort operator capable of achieving an upper throughput value of 400 tuples per second with 100% CPU resources, it may be calculated that reallocating 25% of the sort operator's CPU resources to another operator (thereby lowering the sort operator's throughput rate to 300 tuples per second) results in greater overall performance for the streaming application as a whole. Accordingly, the parameters of 300 tuples/second at 75% CPU utilization may represent one potential target factor value configuration for the described streaming application. Other methods of determining the target factor values are also possible.

In embodiments, the set of profile data for the stream operator includes a set of computing resource arrangements for utilization to develop the streaming application at block 655. The set of computing resource arrangements may include data and information describing the infrastructure and configuration of the computing environment in which the streaming application is intended to operate. The set of computing resource arrangements may include an index, database, list, or other organized body of information describing the physical hardware infrastructure, computing resource allocations, compatibility requirements, networking protocols, and other information regarding the streaming application and the computing environment. In embodiments, the computing resource arrangement may include recommended parameter configurations and settings for the streaming operator based on the infrastructure and nature of the computing environment. Other types of data and information may also be included in the set of computing resource arrangements.

In embodiments, the set of computing resource arrangements may include one or more of a threshold value for a set of processing resources at block 657, a threshold value for a set of memory resources at 658, or a threshold value for a set of disk resources at block 659. For example, the threshold values for the processing, memory, and disk resources may include boundary values (e.g., maximum or minimum) for the respective resources that indicate limits on resource usage with respect to the streaming application. For instance, a threshold value for a set of processing resources may include a total amount of available processing resources (e.g., 12 GHz) to be utilized for a streaming application, such that the processing resources may be divided between each of the streaming operators. Other types of threshold values or threshold values for other resources are also possible.

Consider the following example. A particular computing environment hosting a streaming application may include 11 gigabytes of memory (e.g., a threshold value for memory) for use by the streaming application. During development of the streaming application, a user may implement a particular operator that utilizes 3 gigabytes of memory. In the event that a user attempts to implement four such operators, the computing resource arrangement may indicate to the user that such a configuration exceeds the total memory resources allocated for the streaming application (e.g., 4 operators that use 3 gigabytes of memory each will result in 12 total gigabytes, exceeding the 11 gigabytes available). Accordingly, as described herein, alternative configurations for the streaming application (e.g., replacement operators that use less memory resources, operator arrangements that require less operators) may be suggested to the user. Other methods of using the threshold resource values are also possible.

At block 670, the set of profile data for the stream operator may be established. As described herein, aspects of the disclosure relate to establishing the profile data for utilization to develop a streaming application (e.g., in an integrated development environment). Establishing the profile data can include generating, creating, providing, storing, presenting, displaying, or otherwise instantiating the profile data. In embodiments, establishing the profile data includes adjusting stream application configuration parameters, proposing suggested programming code, presenting the profile data, modifying the profile data (e.g., based on user input, updated computing environment infrastructure, test results) or the like. As described herein, establishing the profile data may facilitate development of a streaming application. Other methods of establishing the set of profile data are also possible.

In embodiments, developing the streaming application includes constructing implementation code at block 672. Constructing implementation code may include generating, building, editing, modifying, or revising portions of programming code for the streaming application. The implementation code may include lines or blocks of code corresponding to additional stream operators, error/bug corrections, suggested features, performance improvements, resource usage efficiency or the like. In various embodiments, the constructed code may be suggested to a user/developer of the streaming application for confirmation before implementation. In certain embodiments, constructing the implementation code may include providing program code configured to perform one or more recommended functions based on the configuration of the streaming application. As an example, in the case of a streaming application that includes a split operator (e.g., to divide the incoming tuples between multiple execution paths), constructing the implementation code may include suggesting the inclusion of a sort operator following the split operator (e.g., in some embodiments it may be desirable to re-order the tuples after being divided by the split operator). Other methods for constructing the implementation code are also possible.

In embodiments, developing the streaming application includes configuring a set of parameters at block 674. Configuring the set of parameters may include modifying, editing, or otherwise adjusting one or more settings or parameters of the streaming application. In embodiments, configuring parameters may include adjusting the resources allocated to a particular stream operator, changing the settings or instructions for a stream operator, or the like. As an example, a filter operator may be configured to remove tuples from a stream by passing along only those tuples that satisfy a specified parameter (e.g., only pass tuples that are greater than 1000 bytes of data). Accordingly, in embodiments configuring the parameters may include editing the parameters of the filter operator to change the instructions for filtering the stream of tuples (e.g., modifying a nature of how the filtering occurs). As another example, in certain embodiments configuring the parameters may include running one or more algorithms (e.g., configuration optimization algorithms, performance testing algorithms) with respect to the streaming application. For instance, an algorithm may be run to calculate the minimum amount of processing resources needed to maintain a certain throughput rate, and then editing the operators of the streaming application based on the results of the calculation. Other methods of configuring the parameters are also possible.

In embodiments, establishing the set of profile data for the stream operator includes providing the set of profile data for the stream operator at block 676. As described herein, the set of profile data for the stream operator may be provided in an integrated development environment for utilization to develop a streaming application. The integrated development environment may include an interface including a variety of tools for development of a stream application. Providing the set of profile data may include presenting or displaying the set of profile data in the interface of the integrated development environment. Aspects of the disclosure, in embodiments, relate to visually presenting the data and information for each stream operator in an organized fashion to facilitate development of a streaming application. In embodiments, an interface may be provided in the integrated development environment that lists a variety of stream operators as well as performance characteristics for each operator. Accordingly, aspects can be utilized to provide dynamic, immediate, or real-time feedback on a streams design/configuration in the integrated development environment.

Consider the following example. An interface of an integrated development environment may include a drag-and-drop interface including a list of available stream operators. In response to a user placing a first operator in an operator graph, the drag-and-drop interface may display a text box with pertinent information such as the tuple throughput rate, memory, processor, and disk resources of the placed operator. One or more stream operators in the drag-and-drop interface may be highlighted or otherwise marked to indicate that they may be helpful/useful in the present stream application development. By selecting a particular stream operator, more detailed information regarding the performance of the selected operator, similar operators, and other helpful data may be presented. Other methods of providing the set of profile data are also possible.

In embodiments, aspects of providing the set of profile data for utilization to develop the streaming application may include running a simulation of the streaming application using the profile data for the stream operators included in the streaming application. The simulation may include a model that simulates the performance of one or more streaming operators with given operating environment parameters (e.g., available hardware resources). In various embodiments, multiple potential outcomes may be provided that forecast and compare the expected performance of multiple operators with given performance profiles in a particular operating environment. For instance, as an example, a stream operator with 10 attributes that occupies 1000 bytes of data may be simulated and compared with another operator that occupies 20000 bytes of data and has 200 attributes. The expected throughput rates for both operators may be calculated based on the profile data of the operators and the parameters of the operating environment. Other methods of using the stream application simulation are also possible.

In embodiments, establishing the set of profile data for the stream operator includes capturing the set of profile data for the stream operator at block 678 the set of profile data for the stream operator may be captured. Capturing the set of profile data may include storing, saving, or otherwise gathering the set of profile data. In certain embodiments, capturing the set of profile data may include saving the set of profile data in a streams manager of the integrated development environment. As an example, capturing may include matching the set of profile data (e.g., the performance characteristics collected at block 614) with the corresponding stream operator, and storing it in the streams manager where it can be accessed by a stream developer. As another example, capturing the set of profile data may include updating the streams manager with additional information collected from real-time operation or performance tests of the stream application. Other methods of capturing the set of profile data are also possible.

Method 600 concludes at block 699. Aspects of method 600 may provide performance or efficiency benefits for stream operator management. For example, aspects of method 600 may have positive impacts with respect to development of a streaming application. The analyzing, the determining, and the establishing described herein may each occur in an automated fashion without user invention. As such, a set of patterns for improving performance (e.g., for stream application development based on the set of profile data) can be automatically applied. Altogether, leveraging the information provided by stream operator performance profiles may be associated with performance or efficiency benefits for stream application development (e.g., development speed, computing resource efficiency).

Figure 7:
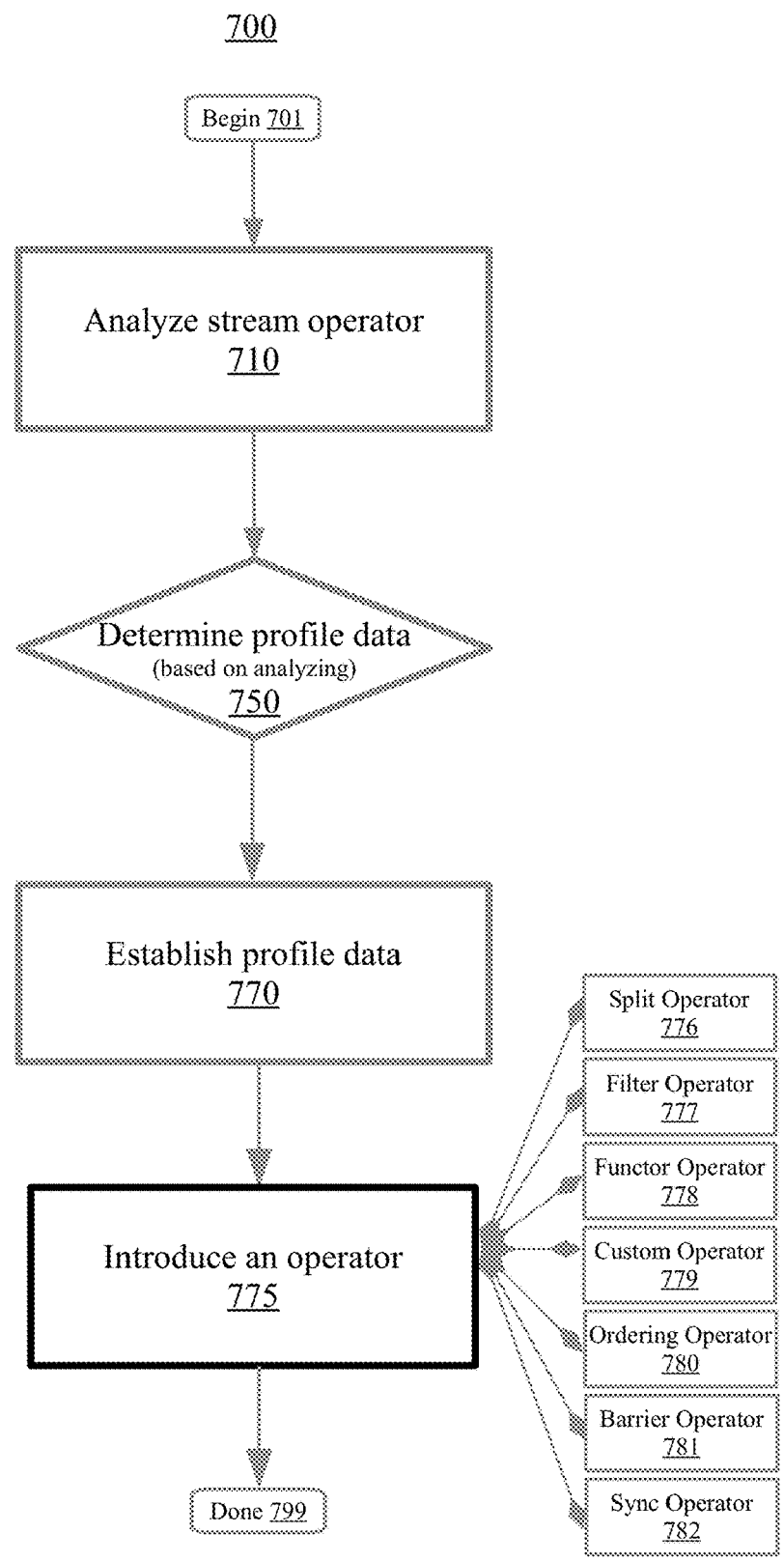
FIG. 7 is a flowchart illustrating a method for managing one or more stream operators associated with a streaming application, according to embodiments.

FIG. 7 is a flowchart illustrating a method 700 for managing one or more stream operators associated with a streaming application, according to embodiments. Aspects of the method 700 may relate to introducing a stream operator using the set of profile data. The method 700 may begin at block 701. A stream operator may be analyzed at block 710. At block 750, profile data for the stream operator may be determined based on the analysis of the stream operator. At block 770, profile data may be established for the stream operator. Aspects of the method 700 may substantially correspond to other embodiments described herein, including FIGS. 1-9.

At block 775, aspects of method 770 relate to introducing an operator using the set of profile data. Introducing an operator may include adding or suggesting a stream operator for inclusion in the operator graph of a streaming application. In embodiments, the operator may be introduced to the operator graph based on a set of profile data (e.g., either the set of profile data for the new operator or the set of profile data for an operator already included in the operator graph). For instance, in certain embodiments the stream manager for a stream application may be configured to perform an analysis of an in-development operator graph, and identify one or more deficiency factors (e.g., particular needs, requirements, or aspects of the streaming application that indicate potential areas of revision) of the streaming application. The stream manager may then compare the identified deficiency factors with the performance profile data for available stream operators, and identify a stream operator for inclusion in the operator graph that has performance characteristics that resolve the deficiency factors (e.g., a join operator may be added to an operator graph configured to handle two or more tuple streams). Other methods of introducing an operator are also possible.

In embodiments, at block 776 a split operator may be introduced to allocate the stream of tuples of a streaming application. The split operator may be configured to divide a stream of data into one or more output streams based on a split parameter. The split parameter may be determined (e.g., automatically) based on one or more factors including the volume of data of the stream, the type of tuples present in the stream, the throughput rate of other operators in the streaming operation, or the like. In embodiments, the split parameter may be defined by a user or stream developer. As an example, a 1000 tuples per second data stream may be sent to a streaming application that includes an operator with a maximum throughput rate of 500 tuples per second (e.g., the data flow will be limited to the speed of the slowest operator; 500 tuples per second). Accordingly, aspects of the disclosure relate to introducing a split operator to divide the data between two or more operators (e.g., an additional operator with a throughput rate of 500 tuples per second) in order to facilitate efficient processing of the data. Other uses for the split operator are also possible.

In embodiments, aspects of the disclosure relate to introducing one or more different types of stream operators to the streaming application. As described herein, introduction of the one or more stream operators may be based on the set of profile data (e.g., either the set of profile data for the new operator or the set of profile data for an operator already included in the operator graph). As examples, the method 700 may include adding a filter operator at block 777 (e.g., to filter out tuples based on a filter condition), a functor operator at block 778 (e.g., to transform input tuples into output tuples and/or filter tuples), a custom operator at block 779 (e.g., to send/receive one or more streams based on a logic parameter), an ordering operator at block 780 (e.g., to sort tuples based on an ordering parameter), a barrier operator at block 781 (e.g., to synchronize tuples from two or more streams), a sync operator at block 782 (e.g., to correlate tuples from two or streams based on pre-determined match predicates and window configuration) and the like. Introduction of other types of stream operators is also possible. Method 700 may conclude at block 799.

Figure 8:
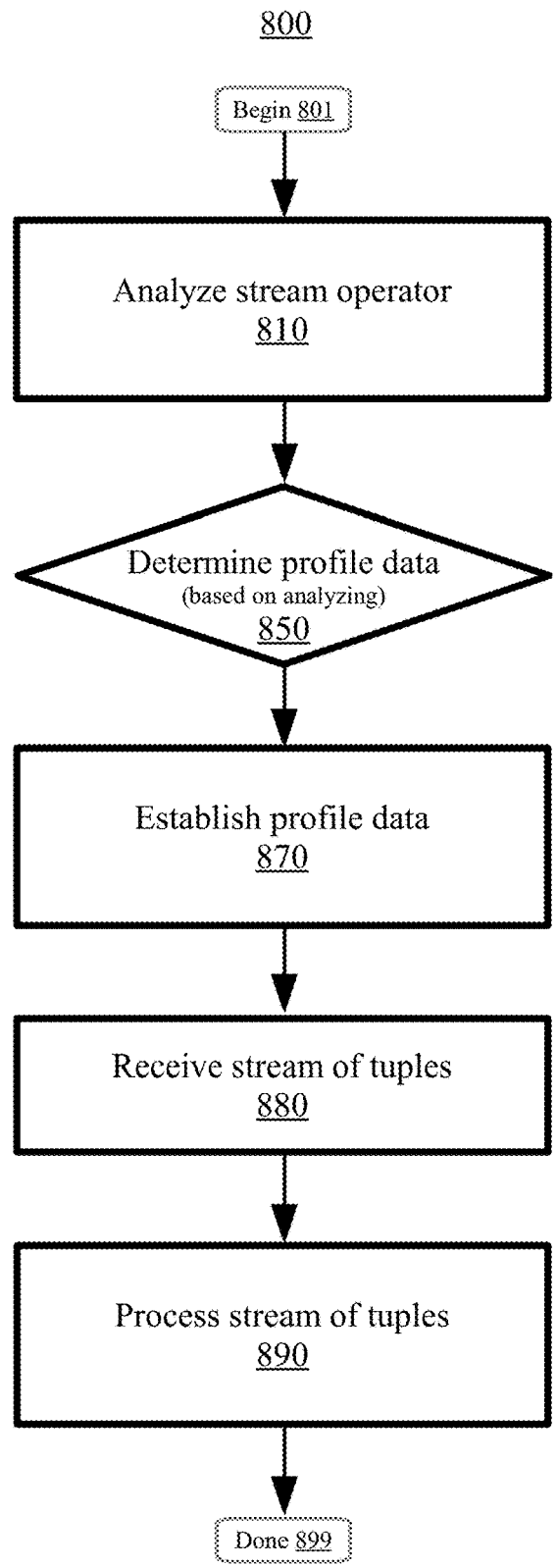
FIG. 8 is a flowchart illustrating a method for managing one or more stream operators associated with a streaming application, according to embodiments.

FIG. 8 is a flowchart illustrating a method 800 for managing one or more stream operators associated with a streaming application, according to embodiments. Aspects of the method 800 may relate to receiving and processing a stream of tuples. The method 800 may begin at block 801. A stream operator may be analyzed at block 810. At block 850, profile data for the stream operator may be determined based on the analysis of the stream operator. At block 870, profile data may be established for the stream operator. Aspects of the method 800 may substantially correspond to other embodiments described herein, including FIGS. 1-9.

At block 880, a stream of tuples is received. The stream of tuples is to be processed by a plurality of processing elements (e.g., stream operators) operating on a set of compute nodes (e.g., in a stream application environment). The stream of tuples may be received consistent with the description herein including FIGS. 1-9. Current/future processing by the plurality of processing elements may be performed consistent with the description herein including FIGS. 1-9. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 890. The stream of tuples may be processed by the plurality of processing elements operating on the set of compute nodes. The stream of tuples may be processed consistent with the description herein including FIGS. 1-9. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators. Method 800 may conclude at block 899.

Figure 9:
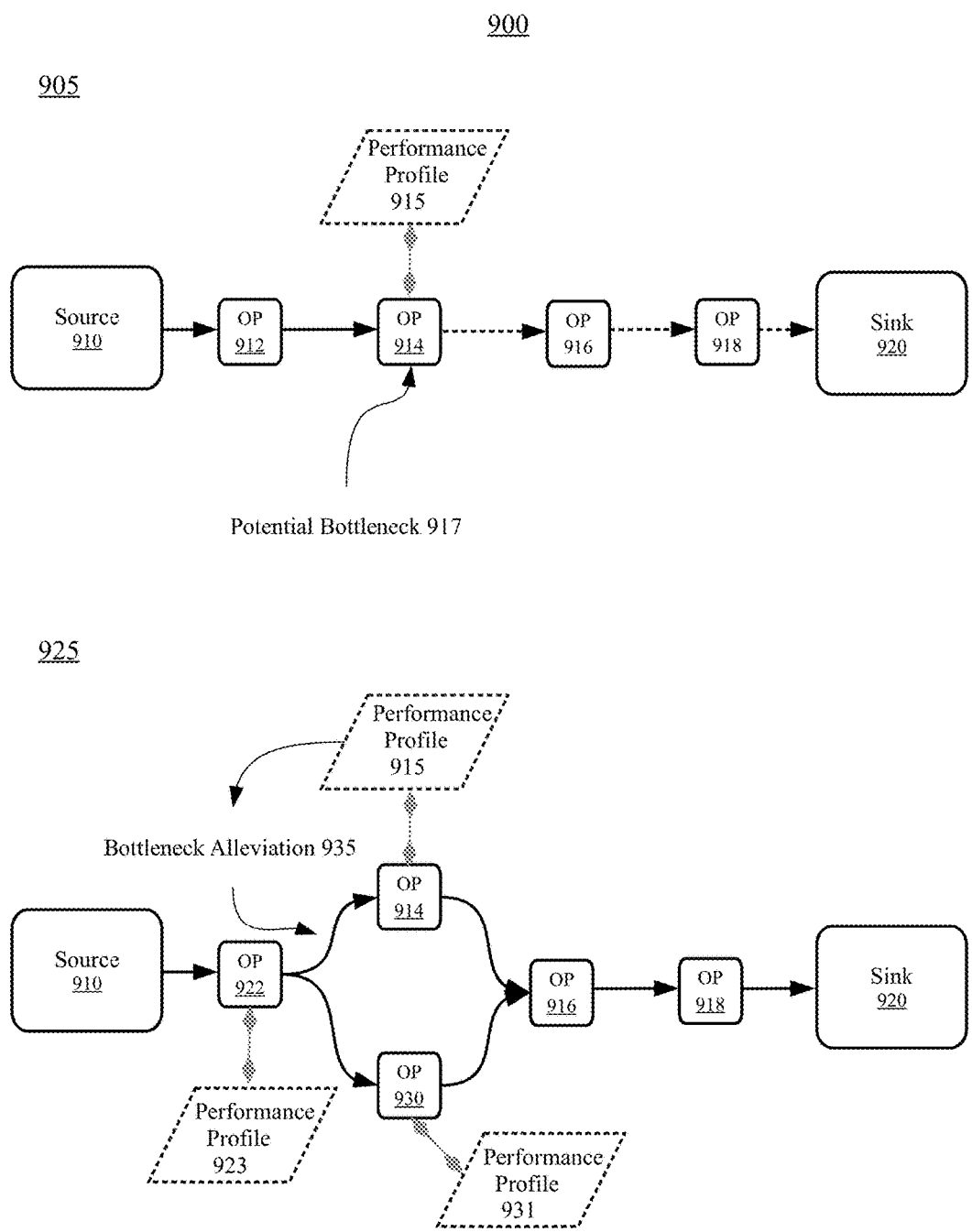
FIG. 9 illustrates an exemplary operator graph for a stream computing application according to embodiments.

FIG. 9 shows an example system 900 with respect to executing a stream computing application, according to embodiments. Aspects of the example system 900 include a streams graph 905 (e.g., including source 910, sink 920, and operators 912-918) and a streams graph 925 (e.g., including source 910, sink 920, and operators 914-918, 922, 930). As described herein, a performance profile (e.g., 915, 923, 931) for one or more operators may be used to identify and alleviate a potential bottleneck (e.g., potential bottleneck 917, bottleneck alleviation 935). As such, aspects of the example system 900 may facilitate development of efficient streaming applications. As shown in FIG. 9, the example system 900 may include a streams graph 905 and a streams graph 925. In embodiments, the streams graph 905 may represent a "before" configuration (e.g., the state of a streams graph before a modification is made, a potential error is rectified) and the streams graph 925 may represent an "after" configuration (e.g., the state of the streams graph after the modification or revision has been introduced).

Aspects of the streams graph 905 may be related to detecting a deficiency factor (e.g., particular need, requirement, or aspect of the streaming application that indicates potential areas of revision) in the streams graph. In embodiments, a stream of tuples may begin from source 910 and flow to sink 920 through stream operators 912, 914, 916, and 918. In embodiments, each stream operator may be configured to perform an operation on the stream of tuples (e.g., process, filter, synchronize, format, parse, transform). Each stream operator may have different performance characteristics (e.g., throughput rate, memory requirements, and processing resources). As described herein, one or more stream operators may include a performance profile describing its function and performance characteristics. For instance, operator 914 may include performance profile 915. As described herein, aspects of the disclosure relate to using the performance profile for one or more operators to facilitate development of a streaming application.

Consider the following example. The stream of tuples beginning at the source 910 may have a data flow rate of 2000 tuples per second. Based on an analysis of the performance profiles for the operators in the streams graph, it may be determined that operators 912, 916, and 918 have throughput rates of at least 2000 tuples per second, however performance profile 915 may indicate that operator 914 has a throughput rate of 1000 tuples per second. As such, it may be determined (e.g., predicted) that operator 914 represents a potential bottleneck 917 for the stream of tuples (e.g., operator 914 will not be able to process tuples fast enough to maintain the flow rate of 2000 tuples per second). The potential bottleneck 917 may represent a deficiency factor of the streams graph 905.

Accordingly, aspects of the streams graph 925 are related to resolving the deficiency factor detected in streams graph 905. Resolving the deficiency factor may include introducing a new stream operator, replacing an existing stream operator, constructing implementation code, or a variety of other techniques. Continuing the example described above, in response to detecting the potential bottleneck 917 based on the performance profile 915, aspects of the streams graph 925 are related to analyzing the potential bottleneck 917 (e.g., the detected deficiency factor) and determining a solution. In embodiments, performance profiles for a variety of available stream operators may be analyzed to identify a stream operator that could be introduced to resolve the potential bottleneck 917. For example, as shown in streams graph 925, based on analysis of performance profile 923 and performance profile 931, a split operator 922 may be introduced to the streams graph 925 in place of operator 912 and operator 930 (e.g., an operator with a throughput of at least 1000 tuples per second) may be introduced to handle one branch of the divided stream of tuples. As such, the stream of tuples may be divided evenly such that 1000 tuples per second flow to operator 914 and 1000 tuples per second flow to newly added operator 930. Accordingly, splitting the stream of tuples may lead to bottleneck alleviation 935. Other methods of alleviating bottleneck 917 are also possible.

Aspects of the disclosure relate to the recognition that, in certain configurations, it may be desirable to re-order the tuples that were split at block 922. Accordingly, in embodiments, a sort stream operator may be placed/inserted immediately preceding stream operator 916 of streams graph 925. The sort stream operator (not depicted) may be configured to receive tuples from operator 914 and operator 930, and assemble, organize, categorize, or otherwise arrange the stream of tuples in preparation to continue-on to operator 916. In embodiments, the sort stream operator may be configured to order the stream of tuples to correspond to the order in which they were received by split operator 922 (e.g., the original order in which they were received from the source). In embodiments, the sort operator may be configured to order stream of tuples as specified by a user-defined sort parameter. Other methods of sorting the stream of tuples (e.g., round-robin, key-hashing techniques) are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, SMALLTALK, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of stream operator management, the method comprising:
   analyzing, with respect to a set of usage indicators, a first stream operator which operates on a computer processor and corresponds to a first processing element for processing a stream of tuples of a stream application;
   determining, based on the analyzing, a first set of profile data for the first stream operator, wherein the first set of profile data includes at least a tuple size threshold value;
   establishing, for utilization to develop the streaming application, the first set of profile data for the first stream operator, wherein establishing the first set of profile data for the first stream operator includes adjusting stream application configuration parameters of the streaming application for processing the stream of tuples;
   responsive to identifying a potential bottleneck representing a deficiency factor in the stream of tuples of the streaming application, comparing the deficiency factor to sets of profile data for available stream operators, the sets of profile data including the first set of profile data; and
   responsive to identifying a second stream operator from the available stream operators for alleviating the potential bottleneck in the stream of tuples, introducing, using a second set of profile data corresponding to the second stream operator, a split operator to the stream application to allocate a portion of the stream of tuples to the second stream operator which operates on the computer processor and corresponds to a second processing element for processing the portion of the stream of tuples, wherein introducing the split operator comprises adding or suggesting the second stream operator for inclusion in an operator graph of the streaming application.

2. The method of claim 1, wherein developing the streaming application includes constructing implementation code.

3. The method of claim 1, wherein developing the streaming application includes configuring a plurality of parameters.

4. The method of claim 1, wherein establishing, for utilization to develop the streaming application, the first set of profile data for the first stream operator includes: providing, for utilization to develop the streaming application in an integrated development environment, the first set of profile data for the first stream operator to provide immediate feedback on a stream design in the integrated development environment.

5. The method of claim 1, wherein establishing, for utilization to develop the streaming application, the first set of profile data for the first stream operator includes: capturing, in a stream manager for utilization to develop the streaming application, the first set of profile data for the first stream operator.

6. The method of claim 1, wherein the set of usage indicators includes a set of values which corresponds to a selection from a group consisting of at least one of:
   a processor utilization factor,
   a memory utilization factor,
   a disk utilization factor, or
   a throughput factor.

7. The method of claim 1, wherein analyzing, with respect to the set of usage indicators, the first stream operator includes: monitoring the first stream operator; identifying, based on the monitoring, a set of values for the set of usage indicators; and collecting the set of values to determine the first set of profile data for the first stream operator.

8. The method of claim 1, wherein the first set of profile data for the first stream operator includes:
   a set of computing resource arrangements for utilization to develop the streaming application.

9. The method of claim 8, wherein the set of computing resource arrangements includes a selection from a group consisting of at least one of:
   a threshold value for a set of processing resources,
   a threshold value for a set of memory resources, or
   a threshold value for a set of disk resources.

10. The method of claim 1, wherein the first set of profile data for the first stream operator further includes a selection from a group consisting of at least one of:
    a tuple type, a tuple quantity threshold value, a tuple processing rate threshold value, an attribute type, an attribute quantity threshold value, an attribute size threshold value, a window size threshold value, or a temporal period threshold value.

11. The method of claim 1, wherein determining the first set of profile data for the first stream operator includes:
    computing a set of threshold factor values which correspond to the set of usage indicators.

12. The method of claim 1, wherein determining the first set of profile data for the first stream operator includes:
    computing a set of target factor values which correspond to the set of usage indicators.

13. The method of claim 12, wherein a first throughput value using the set of target factor values exceeds a second throughput value using a set of original factor values.

14. The method of claim 1, further comprising:
    introducing, using the first set of profile data, a selection from a group consisting of at least one of:
    a filter operator,
    a functor operator,
    a custom operator,
    an ordering operator,
    a barrier operator, or
    a sync operator.

15. The method of claim 1, further comprising: receiving the stream of tuples to be processed by a set of processing elements which includes the first and second processing elements and operates on a set of compute nodes; and processing, using the set of processing elements operating on the set of compute nodes, the stream of tuples.

16. A system for stream operator management, the system comprising:
    a hardware memory having a set of computer readable computer instructions, and
    a processor for executing the set of computer readable instructions, the set of computer readable instructions including:
    analyzing, with respect to a set of usage indicators, a first stream operator which operates on a computer processor and corresponds to a first processing element for processing a stream of tuples of a stream application;
    determining, based on the analyzing, a first set of profile data for the first stream operator, wherein the first set of profile data includes at least a tuple size threshold value;
    establishing, for utilization to develop the streaming application, the first set of profile data for the first stream operator, wherein establishing the first set of profile data for the first stream operator includes adjusting stream application configuration parameters of the streaming application for processing the stream of tuples;

responsive to identifying a potential bottleneck representing a deficiency factor in the stream of tuples of the streaming application, comparing the deficiency factor to sets of profile data for available stream operators, the sets of profile data including the first set of profile data; and responsive to identifying a second stream operator from the available stream operators for alleviating the potential bottleneck in the stream of tuples, introducing, using a second set of profile data corresponding to the second stream operator, a split operator to the stream application to allocate a portion of the stream of tuples to the second stream operator which operates on the computer processor and corresponds to a second processing element for processing the portion of the stream of tuples, wherein introducing the split operator comprises adding or suggesting the second stream operator for inclusion in an operator graph of the streaming application.

17. A computer program product for stream operator management, the computer program product comprising a computer readable storage medium having program instructions embodied therewith, wherein the computer readable storage medium is not a transitory signal per se, the program instructions executable by a processor to cause the processor to perform a method comprising:

analyzing, with respect to a set of usage indicators, a first stream operator which operates on a computer processor and corresponds to a first processing element for processing a stream of tuples of a stream application;

determining, based on the analyzing, a first set of profile data for the first stream operator, wherein the first set of profile data includes at least a tuple size threshold value;

establishing, for utilization to develop the streaming application, the first set of profile data for the first stream operator, wherein establishing the first set of profile data for the first stream operator includes adjusting stream application configuration parameters of the streaming application for processing the stream of tuples;

responsive to identifying a potential bottleneck representing a deficiency factor in the stream of tuples of the streaming application, comparing the deficiency factor to sets of profile data for available stream operators, the sets of profile data including the first set of profile data; and responsive to identifying a second stream operator from the available stream operators for alleviating the potential bottleneck in the stream of tuples, introducing, using a second set of profile data corresponding to the second stream operator, a split operator to the stream application to allocate a portion of the stream of tuples to the second stream operator which operates on the computer processor and corresponds to a second processing element for processing the portion of the stream of tuples, wherein introducing the split operator comprises adding or suggesting the second stream operator for inclusion in an operator graph of the streaming application.

* * * * *